United States Patent [19]
Daggett, Jr. et al.

[11] 3,957,226
[45] May 18, 1976

[54] HELICOPTER YAW AND PROPULSION MECHANISM

[75] Inventors: Myron L. Daggett, Jr., Broomall; Leon L. Douglas, Wynnewood, both of Pa.

[73] Assignee: The Boeing Company, Seattle, Wash.

[22] Filed: Jan. 27, 1975

[21] Appl. No.: 544,077

[52] U.S. Cl. ................................ 244/17.19; 244/52
[51] Int. Cl.² .......................................... B64C 27/82
[58] Field of Search........... 244/17.11, 17.13, 17.19, 244/52, 17.21

[56] References Cited
UNITED STATES PATENTS

| | | | |
|---|---|---|---|
| 3,159,360 | 12/1964 | Ryan et al. | 244/17.19 |
| 3,351,304 | 11/1967 | Stein et al. | 244/17.19 |
| 3,545,702 | 12/1970 | Laville et al. | 244/17.19 |

FOREIGN PATENTS OR APPLICATIONS

| | | | |
|---|---|---|---|
| 1,298,518 | 6/1962 | France | 244/17.19 |
| 606,420 | 8/1948 | United Kingdom | 244/17.19 |
| 1,225,502 | 9/1966 | Germany | 244/17.19 |
| 1,581,060 | 9/1969 | Germany | 244/17.19 |

*Primary Examiner*—Trygve M. Blix
*Assistant Examiner*—Galen L. Barefoot
*Attorney, Agent, or Firm*—Joseph M. Corr

[57] ABSTRACT

A mechanism is provided for controlling the directional heading of a helicopter, particularly during hover and autorotation. In addition the mechanism provides additional thrust which enables the helicopter to increase its maximum velocity. The mechanism includes three nozzles with valves positioned therein, located in the rearward portion of the helicopter fuselage. Two of the nozzles are located on opposite sides of the aircraft fuselage to provide thrust for use in controlling the directional heading of the aircraft. This thrust is also used to counteract the torque generated by the driving of the lifting rotor of the helicopter. The third nozzle is positioned so that the thrust generated by it will increase the forward velocity of the helicopter. A propeller or fan located in the body of the aircraft forces air from intakes through the fuselage to the nozzles. The position of the valves is determined by suitable control linkage.

7 Claims, 6 Drawing Figures

HELICOPTER YAW AND PROPULSION MECHANISM

BACKGROUND OF THE INVENTION

This invention relates to a control and propulsion mechanism for use in aircraft in general and helicopters in particular.

All aircraft require some means to control the direction of the aircraft and to propel the aircraft along its flight path. Helicopters have either one or two main lifting rotors. In tandem rotor helicopters, those helicopters having two lifting rotors, both the propulsive force and those forces required for directional or yaw control are provided by the main rotors. In single rotor helicopters the propulsive force is provided by the main lifting rotor while yaw control has generally been provided by a second and smaller rotor located at the rear or tail of the fuselage.

An inherent aspect of controlling the yaw of the single rotor helicopter is the counteraction of torque generated in driving the main rotor of the helicopter. This torque tends to rotate the entire aircraft in a direction opposite to the rotation of the main lifting rotor. The torque is generated by the resistance of the air to the driving of the rotor. The force required to counteract the torque is relatively large compared to the amount of force required to vary the attitude of the aircraft about its yaw axis. In the event of a power failure, the main rotor "autorotates" or rotates freely permitting the helicopter to "glide" to a safe landing. During autorotation there is a substantial, if not complete, elimination of the torque which tends to rotate the aircraft.

Other mechanisms have been used to control the directional heading of single rotor helicopters and to counteract torque. One manner in which this has been accomplished has been to use two lifting rotors mounted on a common shaft wherein the rotors rotate in opposite directions. The torque generated by these two rotors counteract one another. By changing the torque of one rotor relative to the other directional control is achieved. Another prior art manner in which directional control is accomplished has been to mount jets at the tail of the rotorcraft.

It is generally recognized that helicopters are inherently limited in the maximum velocity which they may achieve. This limitation results from the fact that the main rotor, in addition to supplying lift for the aircraft, must also maintain the aircraft in a stable position about its roll axis. In order to accomplish this the left half of the rotor must generate an amount of lift equal to that generated by the right half of the rotor. As helicopter velocity increases, this becomes increasingly difficult to achieve.

As a helicopter rotor moves forward through air, the velocity of the air passing over the individual rotor blades varies depending upon whether the rotor blade is advancing or retreating with respect to the freestream air. When the blade advances, the velocity of the air passing over the blade is equal to the linear velocity due to rotation of the blade plus the velocity of the aircraft through the air. When the blade retreats, the velocity of the air passing over the blade is decreased by the velocity of the aircraft. This velocity difference results in the advancing blade generating more lift than the retreating blade. In order to compensate for this phenomena the angle of attack of the rotor blades is decreased while it is advancing so as to generate less lift and increased while it is retreating so as to increase lift. In this manner the two halves of the rotor disc generate equal amounts of lift thus maintaining the aircraft in a stable position about its roll axis. The aircraft velocity can increase to the point where this equilibrium cannot be maintained while the aircraft is in level flight. The maximum velocity of the aircraft can be increased beyond this point if lift is sacrificed thus resulting in loss of altitude of the aircraft.

The maximum velocity of the aircraft can also be increased if additional propulsion means are provided. Since the rotor provides both lift, propulsion and control about the roll axis, an auxiliary propulsion device permits that energy, or a portion thereof, which is used to propel the aircraft forward to be used to maintain the aircraft in a stable position about its roll axis.

Another matter in which the maximum velocity of a helicopter has been increased has been to supply the aircraft with small wings which provide some lift at higher velocities. The rotor is then required to generate less lift at the higher velocities enabling more of the energy to be used to propel the aircraft and control roll.

Structures have been proposed in the prior art which control yaw and provide thrust augmentation through the use of jets of air exiting from nozzles in the rearward portion of a helicopter fuselage. They have proven unsatisfactory in that sufficient yaw control was not provided. Another problem with the prior art structures has been the existence of a time delay between actuation of the pilot controlled members and the initiation of the desired control. Additionally, some of these structures have required so much energy, primarily due to losses in changing the direction of air flow, that they were not practical. A particularly accute problem with such structures has been the unsatisfactory, if not complete absence, of yaw control during autorotation and at low speeds. In some cases during autorotation yaw control, if present, has been available in only one direction.

SUMMARY OF THE INVENTION

The mechanism of the present invention provides yaw control, particularly at low speeds and during autorotation. During autorotation yaw control is maintained in both directions. At higher speeds or velocities the invention provides thrust augmentation which increases the helicopter's maximum velocity. This is accomplished with minimal frictional and aerodynamic losses, especially when compared with the structures of the prior art.

The invention includes three nozzles mounted in the tail section of the fuselage of a single rotor helicopter. Ducts within the fuselage bring air from air inlets to the nozzles. A fan located within the fuselage drives the air through the ducts.

A first nozzle is mounted on one side of the fuselage so that the thrust generated by the passage of air through it counteracts the torque generated by the driving of the main rotor. This nozzle is also used to control yaw during hover and low helicopter velocities.

A second nozzle is located on the other side of the helicopter fuselage. The second nozzle is used only during autorotation and then in combination with the first nozzle to provide yaw control in both directions.

A third nozzle is located in the end of the fuselage and is used to provide thrust for propelling the aircraft forward. The third nozzle is used only when the helicopter is traveling at higher velocities and is completely closed during hover and low velocities.

Butterfly valves are used in each of the three nozzles to control the amount of thrust generated by each nozzle. The valves located in the first and second nozzles are aerodynamically shaped which substantially increases the effectiveness of each nozzle. This is accomplished by more efficient turning of the air through the duct prior to its exiting from the nozzle. Additionally, the valve functions as an airfoil and generates an aerodynamic force which acts in the same direction as the thrust generated by the air exiting from the nozzle. The total amount of force generated by each nozzle is equal to the thrust created by air passing through the nozzle plus the force generated aerodynamically by the passage of air over the aerodynamically shaped valve.

A vertical fin and rudder are mounted to the upper portion of the aircraft fuselage. At high velocities the vertical fin provides a sufficient force to counteract the torque generated by the driving of the main rotor. At these velocities the rudder provides effective yaw control, thus permitting the first and second nozzles to be completely closed.

The invention provides yaw control in direct response to pilot movement of rudder pedals mounted in the cockpit. Automatic control means is provided which at low speeds automatically engages the second valve in the event autorotation occurs. The control means also automatically transfers yaw control from the first nozzle to the vertical fin and rudder as the aircraft velocity increases and automatically engages the third nozzle so that thrust augmentation is thus provided.

Accordingly, it is an object of the present invention to provide a mechanism which will generate thrust for controlling the yaw or direction of a helicopter and provide thrust for propelling the aircraft forward.

It is an additional object of the present invention to provide an aircraft having three nozzles located in the aft end of an aircraft fuselage. The thrust generated by the passage of air through the three nozzles is used to control yaw and provide thrust to increase the maximum velocity of the aircraft.

It is another object of the present invention to provide a mechanism which will control yaw primarily at low speeds and provide thrust which will increase the maximum speed of the aircraft at high speeds.

It is still another object of the present invention to provide a mechanism which will provide air to the aforesaid nozzles in such a manner so as to minimize aerodynamic losses and generate forces which will compliment the thrust generated by the nozzles.

It is still another object of the invention to provide a mechanism which will generate thrust by passing air through nozzles for controlling the yaw or direction of a helicopter during autorotation.

BRIEF DESCRIPTIONS OF THE DRAWINGS

DESCRIPTION OF THE PREFERRED EMBODIMENT

Figure 1:
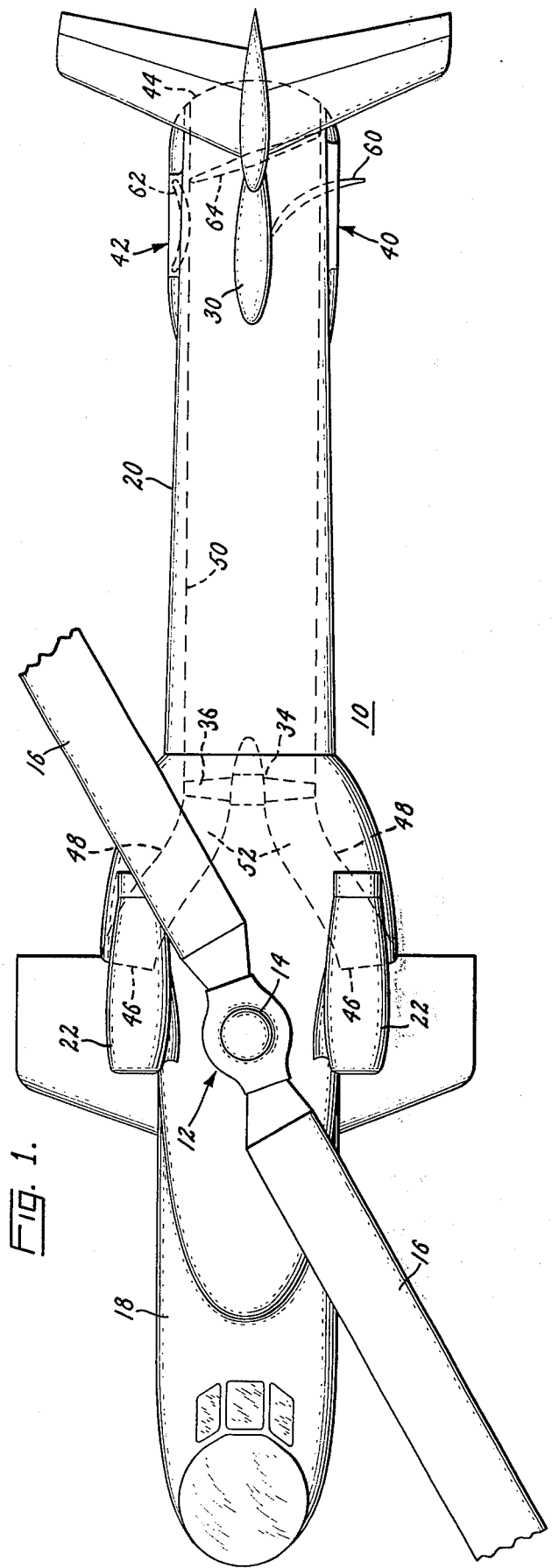
FIG. 1 is a plan view of a helicopter showing the yaw and propulsion mechanism of the present invention installed therein.
Figure 2:
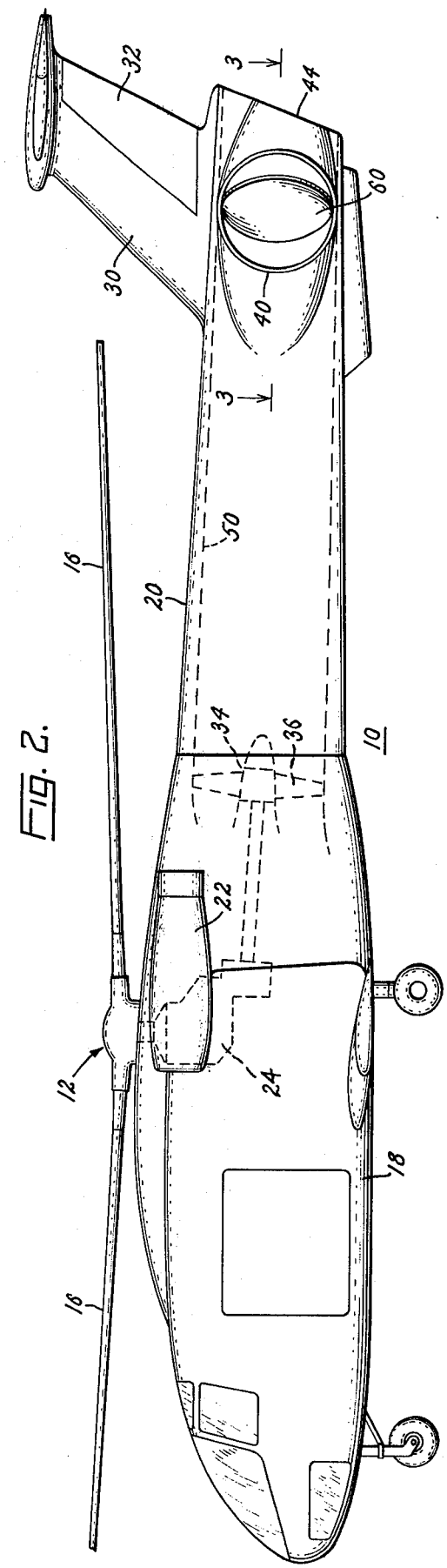
FIG. 2 is a side view of the aircraft shown in FIG. 1.
Figure 3:
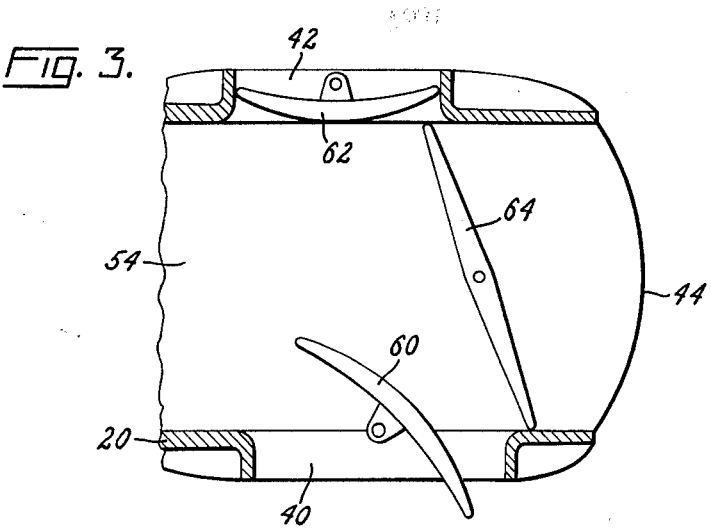
FIG. 3 is a top elevation view taken along line 3—3 in FIG. 2, showing the three nozzles and butterfly valves located therein, which form a portion of the present invention.

FIGS. 1 and 2 depict an aircraft 10 with the present invention incorporated therein. The aircraft 10 includes a rotor 12 for providing lift and propulsion. The rotor 12 includes a hub 14 and blades 16. The aircraft fuselage 18 includes an aft portion 20.

The drive shafts of the engines 22 are connected to a transmission 24. An output shaft from the transmission 24 is connected to the rotor 12. In operation the rotor is driven by the engines in a counterclockwise direction as viewed in FIG. 1.

A vertical fin 30 including a rudder 32 is connected to the aft portion of the fuselage 20.

The helicopter yaw and propulsion mechanism of the present invention includes a fan 34 which is connected to the transmission 24. The fan 34 includes blades 36 which are pivotally mounted to a hub. By rotating all the blades of the fan the same amount, collective pitch change is achieved. Both the main lifting rotor 12 and the fan 34 normally operate at a constant speed or constant RPM. Thus, when it is desired to change the volume of air displaced by the fan it is necessary to change the collective pitch of the blades 36.

The nozzles which provide the yaw control and propulsion augmentation of the present invention are located in the tail of the rearward portion 20 of the fuselage. A first Nozzle 40 and second nozzle 42 generate the thrust which is used for controlling yaw. A thrid Nozzle 44 generates thrust which increases the helicopter's forward velocity.

Ambient air is driven by the fan 34 to the three nozzles. Ambient air passes through inlets 46 through ducts 48 in the fuselage 18 to the fan 34. The air then passes from the fan through duct 50 to the nozzles.

The volume of air which passes through each of the nozzles is controlled by a butterfly valve located in each nozzle. Airfoil shaped butterfly valves 60 and 62 are located in nozzles 40 and 42 respectively. It is the use of the airfoil shaped butterfly valve which results in the invention being substantially more efficient than the similar prior art structures. This efficiency is achieved in two different ways. First, the curved airfoil shape turns the air approximately 90° with minimal aerodynamic losses. This is achieved as the curved aerodynamic shape minimizes turbulance which would otherwise occur if another type of valve were used. Secondly, the aerodynamically shaped butterfly valve acts in much the same manner as a wing and generates an aerodynamic force which acts in the same direction as the thrust generated by air exiting from the nozzle. Thus, the total amount of thrust generated by a nozzle is equal to that thrust generated by the air exiting therefrom plus the amount of force aerodynamically generated by the butterfly valve.

A butterfly valve 64 is located in the third nozzle 44. This valve is not aerodynamically shaped as the air controlled by it is not required to change direction. There is also no advantage in increasing the ability of this valve to generate aerodynamic force.

Normal operation of the invention will now be described. The only direct control the pilot of the helicopter has over the invention is the control of yaw through the use of rudder pedals 68. All other motions of the invention are controlled by a control mechanism 70, which will be subsequently described in detail.

At hover and during low speeds valves 62 and 64 will be closed. Pilot movement of rudder pedals 68 to control yaw will vary the positions of both valve 60 and rudder 32. However, at very low speeds the fin 30 and rudder 32 are ineffective in counteracting torque and controlling yaw. Therefore, this function is served entirely by the nozzle 40. To keep the aircraft pointing in a constant direction the valve 62 must be open enough so that nozzle 40 generates sufficient thrust to counteract the torque generated by the driving of the rotor 12. To yaw the aircraft to the left the pilot depresses the left rudder pedal causing the valve 60 to open further thereby increasing the thrust generated by the nozzle 40. Depressing the right rudder pedal causes the valve 60 to close thereby reducing the amount of thrust generated by the nozzle 40 thus causing the aircraft to yaw to the right.

As the aircraft increases its speed, the fin 30 and rudder 32 become increasingly effective in controlling the yaw of the aircraft, thus reducing the amount of thrust required from nozzle 40. At some predetermined first velocity the control mechanism 70 automatically begins to close the valve 60 and to open the valve 64. This predetermined first velocity is approximately 80 miles per hour. At a second predetermined velocity, approximately 100 mph, the valve 60 will be completely closed while the valve 64 will be completely open. The valve 64 therefore is either completely closed or completely open except during transition between the two predetermined velocities. It is to be understood that the particular values of the two predetermined velocities will change according to particular design requirements of the various aircraft to which the present invention is applied.

Of course, when the valve 64 is open air exits from the nozzle 44 producing thrust which assists the rotor 12 in propelling the aircraft forward. The additional thrust provided is sufficient to increase the maximum speed of a light weight single rotor helicopter 50 mph. This means that for a helicopter of conventional design a normal maximum velocity of 175 mph can be increased to 225 mph.

As previously indicated, in the event there is power failure or loss of power to the main rotor, for whatever reason, autorotation occurs. Autorotation refers to the windmilling effect which causes the rotor to rotate notwithstanding loss of power when the helicopter is in forward flight. Autorotation is equivalent to gliding in a fixed wing aircraft. As an autorotating helicopter approaches the ground, the pitch of the rotor blades is maintained at a small angle of attack. This causes the rotor to rotate at a relatively high rate. Just prior to landing the pilot increases the collective pitch of the rotor blades causing the angle of attack of the blades to increase thus causing the rotor to generate more lift. In this manner the high kinetic energy is transformed to lift enabling the helicopter to make a smooth and gentle landing. It is, of course, necessary that the pilot be able to control the direction or yaw of the aircraft during this phase so that the landing site may be selected and objects on the ground avoided. The present invention provides yaw control in both directions under these circumstances. During autorotation use of the nozzle 40 alone at low speeds and hover is ineffective to provide yaw control in both directions. Full yaw control is achieved through the use of nozzle 42.

Autorotation is sensed by the control mechanism 70 which then automatically causes the valve 62 to move in response to pilot actuation of rudder pedals 68. The nozzle 42 then acts in combination with the nozzle 40 to control the yaw of the aircraft. Depression of the right rudder pedal will cause the control mechanism 70 to close the valve 60 and open the valve 62. The valves will operate in the opposite direction when the left rudder pedal is depressed. If autorotation should occur at the higher velocities, the control mechanism will keep valve 60 closed. However, as the aircraft velocity decreases the control system will automatically engage both valves.

Figure 4A:
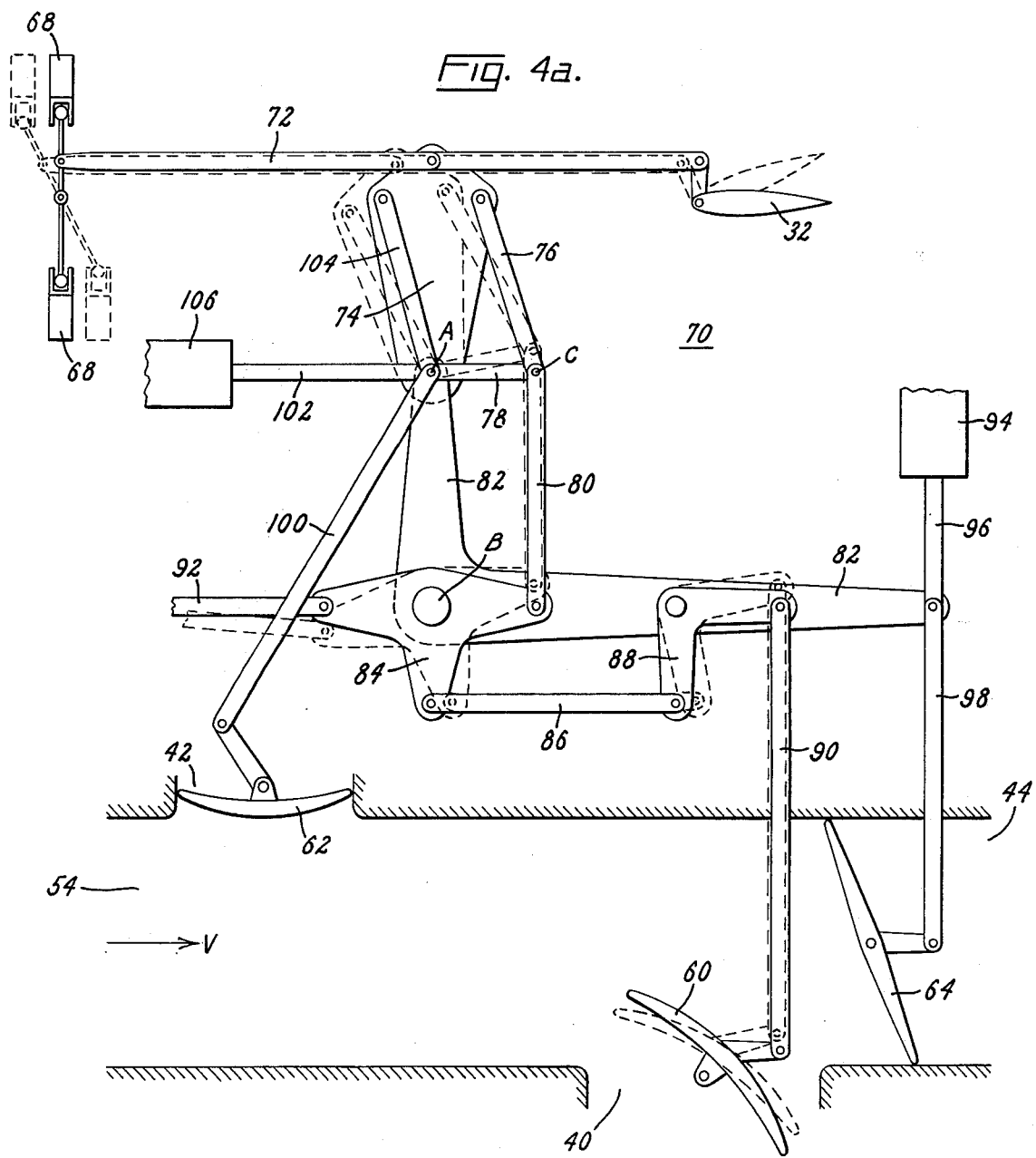
FIG. 4a is a schematic representation of the control mechanism of the present invention in its low speed configuration.
Figure 4B:
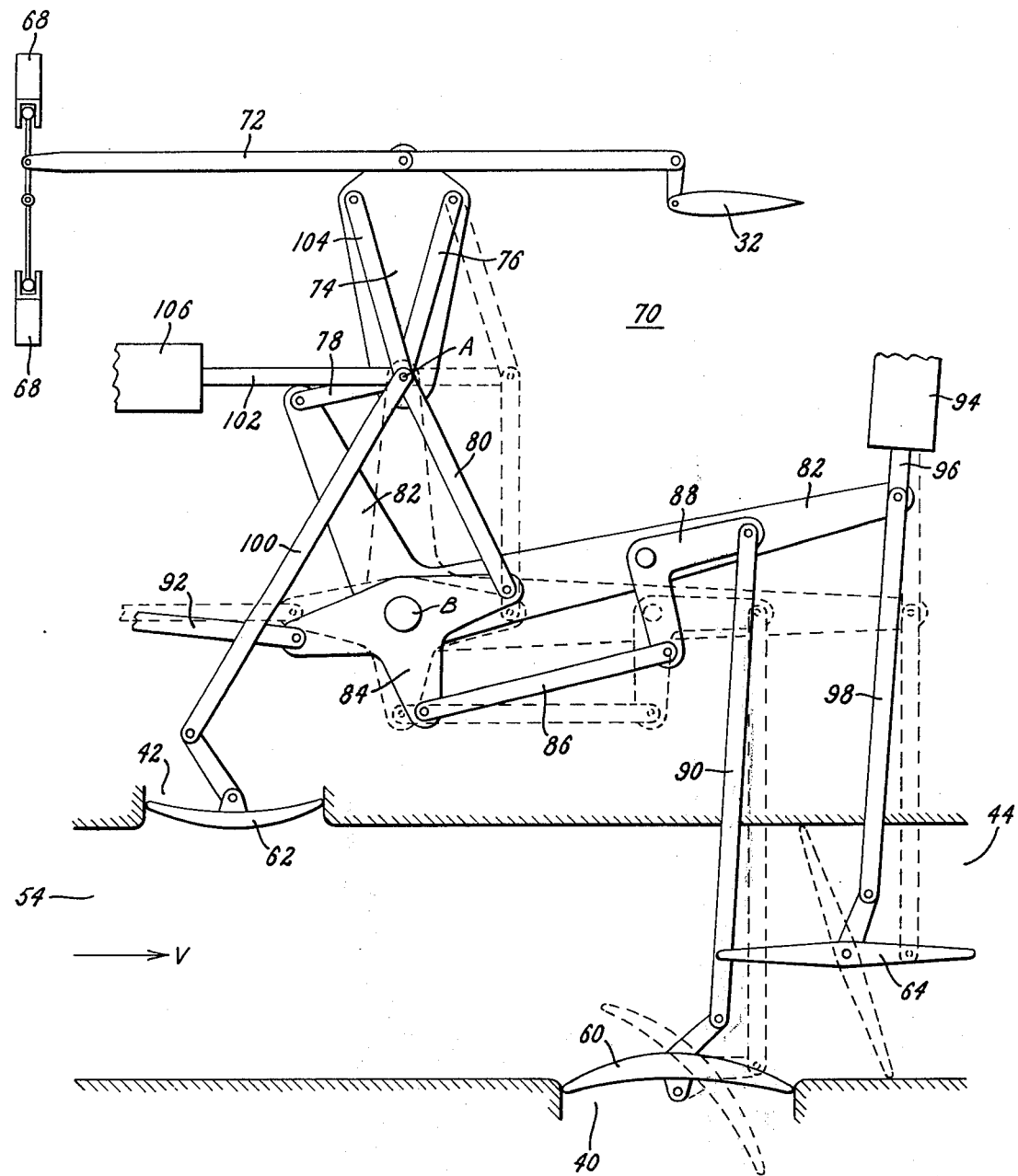
FIG. 4b is the control mechanism shown in FIG. 4a in its high speed configuration.
Figure 4C:
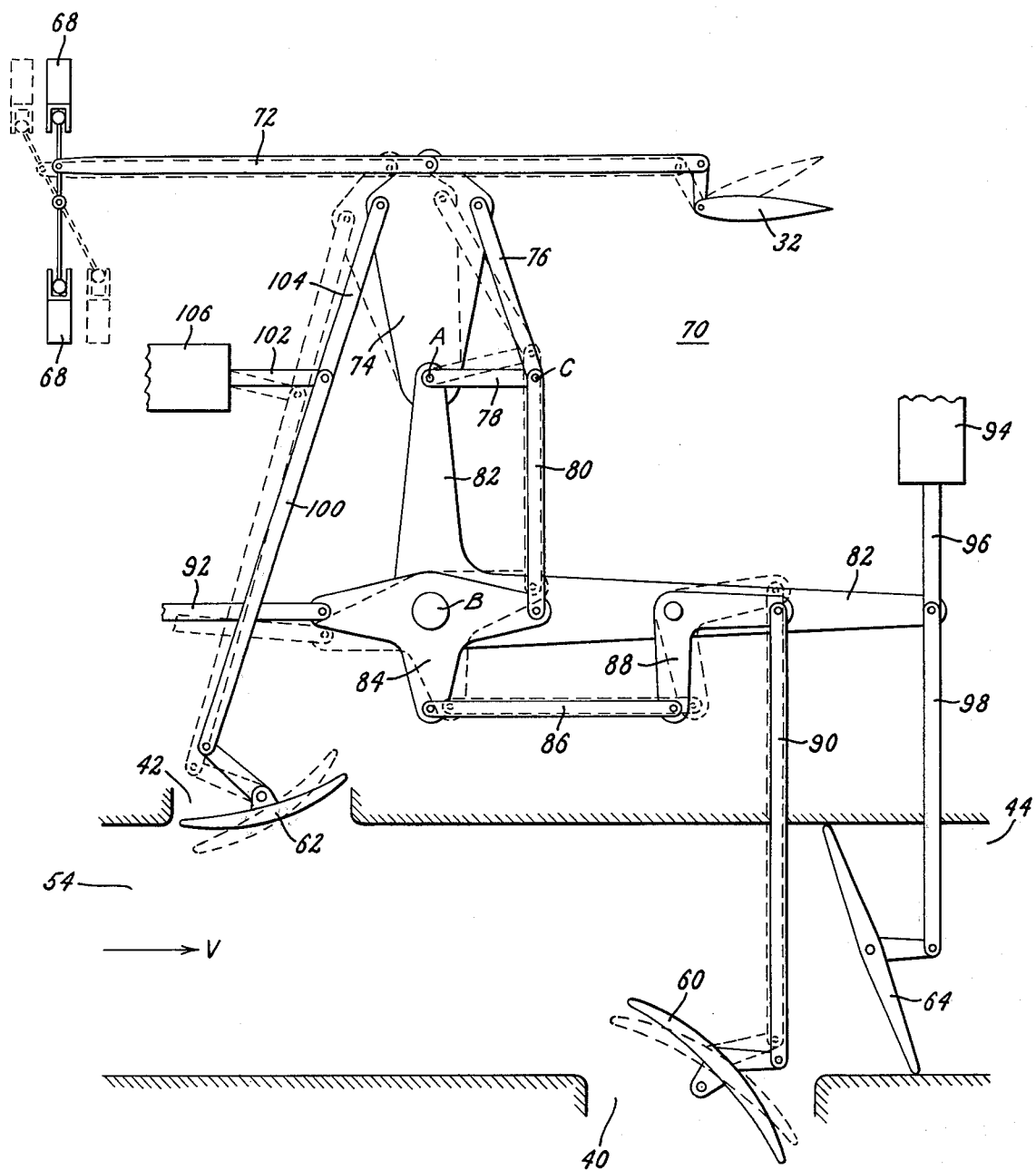
FIG. 4c is the control mechanism in its low speed configuration during autorotation.

A schematic representation of the control mechanism 70 is depicted in FIGS. 4a, 4b, and 4c. In FIG. 4a the mechanism 70 is shown in its position during hover and at low speeds while the aircraft is traveling or heading in a fixed direction. The rudder pedals 68 are connected to the control mechanism 70 by link 72. The position of the components of control mechanism 70 when the right rudder pedal is depressed is shown in phantom in FIG. 4a. Movement of link 72, which is pivotally connected to a bellcrank 74 causes the bellcrank 74 to rotate about point A. Rotation of bellcrank 74 causes movement of a link 76 which is pivotally connected to it. Link 76 is pivotally connected to links 78 and 80 at point C which are also pivotally connected to bellcranks 82 and 84 respectively.

Bellcrank 82 is pivotally connected to the helicopter at point B while bellcrank 84 is pivotally connected to bellcrank 82 at point B. Movement of link 76 causes rotation of bellcrank 84 while bellcrank 82 remains stationary. Link 86 is pivotally connected to bellcranks 84 and 88. Rotation of bellcrank 84 thus causes rotation of bellcrank 88. Link 90 is pivotally connected to both bellcrank 88 and valve 60, which is pivotally mounted in nozzle 40. Thus, it may be seen that rotation of bellcrank 88 causes rotation of the valve 60.

Rotation of the bellbrank 84 in either direction causes the link 92 to be pulled. The opposite end of link 92 (not shown) is connected to the collective pitch control for the fan 34. Thus, pulling of the link 92 increases the collective pitch of the fan. It will be seen that collective pitch is increased whenever the pilot changes direction. Increasing the collective pitch increases the volume of air passed through duct 50 thus enabling the nozzles to generate more thrust for yaw control.

Operation of the control system at higher speeds will now be discussed with reference to FIG. 4b. The low speed configuration is shown in phantom. Actuator 94, which includes well known velocity sensing means, is connected to bellcrank 82 by link 96. Link 98 is pivotally connected to the valve 64 at one end and to the bellcrank 82 at its other end. The actuator 94 moves the link 96 in the direction indicated at the predetermined first velocity. Link 96 is fully displaced at the predetermined second velocity. Movement of link 96 causes link 98 to move thus, actuating valve 64. Movement of link 96 also causes bellcrank 82 to rotate about point B. Rotation of bellcrank 82 causes the pivot point C to become coincident with point A. When point C is coincident with point A rotation of bellcrank 74 no longer causes movement of bellcrank 84. When this occurs, pilot movement of rudder pedals 68 no longer controls the position of the valve 60. As bellcrank 82 rotates bellcrank 88 is displaced. Since bellcrank 88 is not free to rotate, link 90 is displaced causing the valve 64 to become closed. Thus, when the second predetermined velocity is reached, the valve 64 is completely open while valve 60 is completely closed.

Rotation of bellcrank 82 also causes rotation of bellcrank 84. This causes link 92 to be pulled thus increasing collective pitch of the fans. In this manner an increased volume of air is provided to the nozzle 44 increasing the thrust produced by it.

Operation of the control mechanism 70 during autorotation will now be discussed with reference to FIG. 4c. Shown in phantom are the positions of the mechanism components when the right rudder pedal is depressed. Valve 62, which is normally closed, is pivotally connected to link 100 which is also pivotally connected to links 102 and 104. Link 104 is pivotally connected to bellcrank 74. The remaining end of link 102 is connected to an actuator 106. Actuator 106 includes sensing means, not shown, for detecting loss of torque to the rotor. During normal operation the point of juncture of links 100, 102, and 104 is coincident with point A as shown in FIG. 4a. Thus, rotation of bellcrank 74 causes no movement of link 100 and valve 62. As shown in FIG. 4c actuator 106 causes a displacement of this juncture to the left, in the figures, when loss of torque to the rotor is sensed. This also causes valve 62 to partially open. The displacement of this juncture results in link 104 being moved with respect to this partially open position when bellcrank 74 is rotated. Movement of link 104 thus causes movement of link 100 and the valve 62. Depression of the right rudder pedal rotates bellcrank 74 thereby causing the valve 62 to open further thus generating a thrust which will cause the aircraft to rotate to the right. Of course, depression of the left rudder pedal has the opposite effect. The valve 60 operates during autorotation as it normally does during hover and low speeds, as shown in FIG. 4a.

While the invention has been illustrated and disclosed with reference to a preferred embodiment, it is to be understood that various changes and modifications may be made to the invention without departing from the spirit thereof.

What is claimed is:

1. A helicopter which includes: a fuselage; a vertical stabilizer connected to said fuselage; a rudder connected to said stabilizer; a single main lifting rotor rotatably connected to said fuselage for lifting and propelling said helicopter; a motor connected to said fuselage and rotatably connected to said rotor; and a mechanism for controlling yaw and providing thrust augmentation to aid in propelling the helicopter forward which comprises:

an air inlet in said fuselage;
   a duct positioned in said fuselage, connected at one end thereof to said inlet so that air may pass through said inlet to said duct;
   a first nozzle positioned in the rear portion of said fuselage, connected to said duct so air may pass from said duct and exit through said first nozzle generating a force which acts in a first direction tending to counteract torque generated when said motor drives said rotor;
   a second nozzle positioned in the rear portion of said fuselage on the side thereof opposite said first nozzle connected to said duct so air may pass from said duct and exit through said second nozzle thereby generating a force which acts in a second direction opposite said first direction;
   a third nozzle positioned in the rear portion of said fuselage connected to said duct so air may pass from said duct and exit through said thrid nozzle generating a force which acts in a third direction tending to propel said aircraft forward;
   a first valve mounted in said first nozzle for controlling the volume of air which may pass there through;
   a second valve mounted in said second nozzle for controlling the volume of air which may pass there through;
   a third valve pivotally mounted in said third nozzle for controlling the volume of air which may pass there through;
   a fan mounted in said duct for driving air from said inlet to said nozzles, operably connected to said motor; and
   a control means, including a pilot operable member connected to said rudder, connected to said fuselage, and connected to said first, second and third valves to vary the position of said valves, said control means maintaining said second and third valves in a closed position below a predetermined first velocity of the helicopter while varying the position of said first valve in response to pilot movements of said pilot operable member, said control means maintaining said first and second valves in a closed position above a predetermined second velocity of the helicopter while maintaining said third valve in an open position, and said control means varying the position of said second valve in response to pilot movements of said pilot operable member below said first predetermined velocity in the event autorotation occurs so that the forces generated by said first nozzle and said second nozzles cooperate to control the yaw of said aircraft.

2. The helicopter of claim 1 wherein said first and second valves are butterfly valves pivotally mounted in said first and second nozzles, respectively.

3. The helicopter of claim 2 wherein said first and second butterfly valves have an airfoil shape, causing said first butterfly valve to generate a force aerodynamically which acts in said first direction thus cooperating with the force generated by said first nozzle, and causing said second butterfly valve to generate a force aerodynamically which acts in said second direction thus cooperating with the force generated by said second nozzle.

4. The helicopter of claim 1 wherein said fan includes blades pivotally mounted to a hub, and collective means for varying the angle of attack of said blades collectively; and wherein said collective means is connected to said control means whereby said blades are pivoted collectively, in response to pilot movement of said pilot operable member when the velocity of the helicopter is below said first predetermined velocity, and when said helicopter increases its velocity above said first predetermined velocity.

5. The helicopter of claim 4 wherein said control means comprises:
   a first bellcrank pivotally connected to said fuselage at a point A, and to said pilot operable member;
   a second bellcrank pivotally connected to said fuselage at a point B;

a third bellcrank pivotally connected to said second bellcrank at said point B;

a fourth bellcrank pivotally connected to said third bellcrank;

a first member pivotally connected at one end to said first bellcrank;

a second member pivotally connected at one end thereof to said second bellcrank, and the other end thereof to the remaining end of said first member at a point C displaced a first distance from said point A;

a third member pivotally connected at opposite ends thereof, to said third bellcrank, and to said first and second members at said point C, said third member having a distance equal to said first distance between the two pivot points thereof;

a fourth member pivotally connected at opposite ends thereof to said second and fourth bellcranks so that rotation of said second bellcrank will cause rotation of said fourth bellcrank in the same direction;

a fifth member pivotally connected at opposite ends thereof to said fourth bellcrank and to said first valve so that axial movement of said fifth member causes said first valve to vary its position;

a sixth member pivotally connected at opposite ends therof to said third bellcrank and to said third valve so that axial movement of said sixth member causes said third valve to vary its position; and a first actuator responsive to helicopter velocity, connected to said fuselage, said third bellcrank and to said sixth member, said first actuator being at a first position until said helicopter reaches said first predetermined velocity, and being at a second position when said helicopter is at said second predetermined velocity, said third valve being closed when said first actuator is at said first position and fully open when said first actuator is at said second position, said point C being displaced from said point A when said first actuator is at said first position and said point C being substantially coincident with said point A when said first actuator is at said second position, whereby when said first actuator is at said first position movement of said pilot operable member causes said first valve to vary its position and whereby when said first actuator is at said second position said first valve is closed notwithstanding movement of said pilot operable member.

6. The helicopter of claim 5 wherein said control means further includes:

a seventh member having a pivot point between the ends thereof, connected at opposite ends thereof pivotally to said first bellcrank and to said second valve; and a second actuator responsive to autorotation having a normal first position and a second position when the helicopter autorotates, connected to said fuselage and pivotally to said seventh member at the pivot point thereof so that said pivot point is coincident with said point A when said second actuator is at said first position maintaining said second valve in a closed position notwithstanding movement of said pilot operable member, said pivot point of said seventh member being displaced from said point A when said second actuator is at said second position thus opening said second valve and varying its position in accordance with movement of said pilot operable member.

7. The helicopter of claim 6 wherein said control means further includes an eighth member operably connected at opposite ends thereof to said second bellcrank and to said collective means whereby collective pitch of said fan is varied in accordance with the position of said second bellcrank.

* * * * *